United States Patent [19]

Pipkin et al.

[11] Patent Number: 4,601,423
[45] Date of Patent: Jul. 22, 1986

[54] ABRASIVE BODIES

[76] Inventors: Noel J. Pipkin, 115 Pritchard Street, Johannesburg North, Randburg, Transvaal; Trevor P. Elworthy, 5 Orpen Court, Viscount Avenue, Windsor Park, Transvaal, both of South Africa

[21] Appl. No.: 533,262

[22] Filed: Sep. 16, 1983

[30] Foreign Application Priority Data

Sep. 16, 1982 [ZA] South Africa .................. 82/6798

[51] Int. Cl.$^4$ .................................. B23K 1/20
[52] U.S. Cl. .................................. 228/121; 228/124
[58] Field of Search ........... 228/121, 122, 124, 263.12; 420/502, 503, 505, 508, 512; 51/309, 295

[56] References Cited

U.S. PATENT DOCUMENTS

| 2,739,375 | 3/1956 | Coxe ..................... 228/263.12 X |
| 4,063,909 | 12/1977 | Mitchell ................... 51/295 |
| 4,117,968 | 10/1978 | Naidich et al. ............ 228/263.12 X |
| 4,228,942 | 10/1980 | Dietrich .................... 228/121 |
| 4,471,026 | 9/1984 | Nicholas et al. ........... 228/121 X |

FOREIGN PATENT DOCUMENTS

| 559434 | 6/1958 | Canada ..................... 420/502 |
| 3915 | 5/1979 | European Pat. Off. . |
| 38072 | 10/1981 | European Pat. Off. ...... 228/122 |
| 1151666 | 7/1963 | Fed. Rep. of Germany ...... 420/502 |
| 2395237 | 1/1979 | France . |
| 95670 | 6/1983 | Japan ...................... 228/263.12 |
| 980622 | 1/1965 | United Kingdom ........... 420/503 |

OTHER PUBLICATIONS

*Chemical Abstracts,* vol. 91, No. 14, Oct. 1979, p. 238, No. 111602w.
*Chemical Abstracts,* vol. 79, No. 1, Jan. 1974, p. 234, No. 56844b.

Primary Examiner—Kenneth J. Ramsey
Attorney, Agent, or Firm—Scully, Scott Murphy & Presser

[57] ABSTRACT

A cubic boron nitride compact is bonded to a cemented carbide support through an alloy bonding layer which contains 40 to 70 percent by weight silver, gold or a combination thereof and 1 to 10 percent by weight of a high melting metal selected from the group of titanium, zirconium, hafnium, vanadium, niobium, tantalum, chromium and molybdenum. Bonding may be achieved by first metallizing a surface of the cubic boron nitride compact with a layer of gold or silver or a gold or silver based alloy and then bonding the metallized layer to the carbide support by means of a braze alloy having a liquidus temperature above 700° C.

11 Claims, 1 Drawing Figure

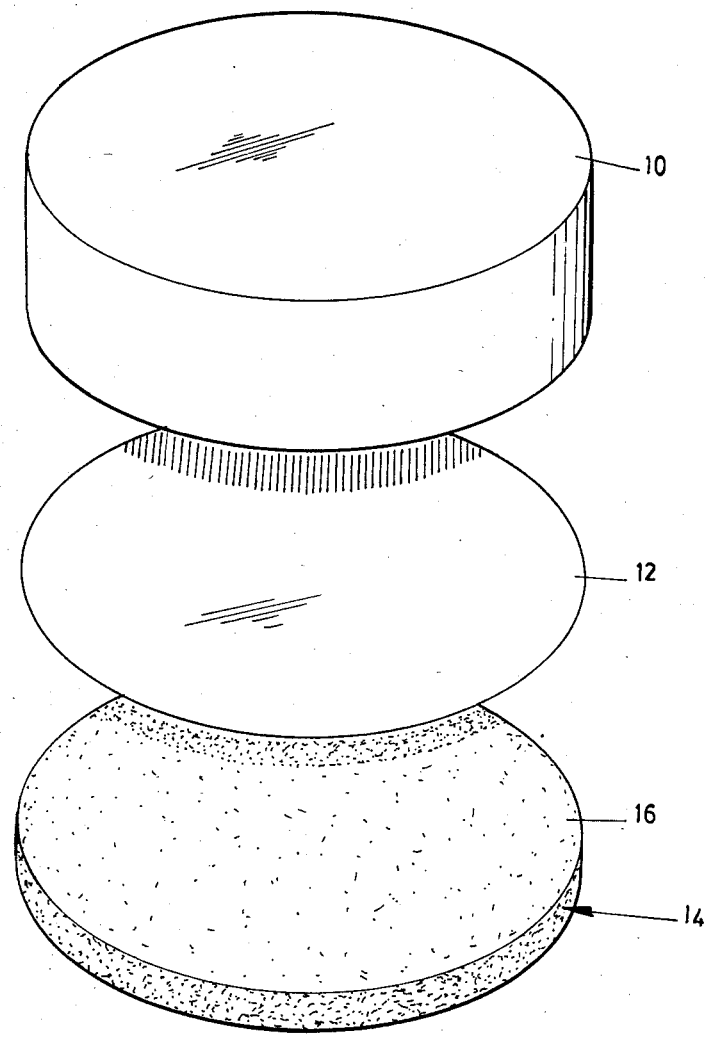

ABRASIVE BODIES

BACKGROUND TO THE INVENTION

This invention relates to abrasive bodies.

Cubic boron nitride (CBN) compacts are well known in the art and consist of a polycrystalline mass of CBN particles bonded into a hard conglomerate. The CBN content of compacts is at least 70 percent by volume and generally between 80 to 90 percent by volume.

CBN compacts may be self-bonded without the aid of a bonding matrix or second phase. Alternatively, such compacts may be produced where there is a suitable bonding matrix or second phase. When a second phase or bonding matrix is present, it will generally contain a catalyst (also known as a solvent or sintering aid material) for cubic boron nitride growth. Examples of suitable catalysts are aluminium or an alloy of aluminium, nickel, cobalt, iron, manganese or chromium.

The presence of a catalyst for CBN is desirable because then under the conditions necessary for the manufacture of a CBN compact some intergrowth between the particles is likely to occur. As is known in the art, CBN compacts are manufactured under conditions of temperature and pressure at which the abrasive particle is crystallographically stable.

CBN compacts can be used in a variety of abrading applications such as cutting, grinding, drilling, turning and the like. For such applications, they may be bonded to a suitable tool or shank. Alternatively, they may be bonded to a cemented carbide backing or support which is then bonded to the tool or shank.

CBN compacts bonded to a cemented carbide support, called composite compacts, have been described in the patent literature and are in commercial use. The CBN compact may be bonded directly to the cemented carbide support without the interposition of a bonding layer. Such composite compacts and their manufacture are described, for example, in U.S. Pat. Nos. 3,743,489 and 3,767,371. Bonding of CBN compacts to cemented carbide supports may also be through a metal or alloy bonding layer. Such are described in U.S. Pat. No. 4,063,909. The bonding layers described in this specification include high temperature braze metals such as titanium, tantalum, nickel, cobalt, iron, chromium, manganese, vanadium, molybdenum, or platinum and alloys containing one or more of these metals, either alone or with a low temperature braze.

Bonding of CBN compacts to cemented carbide supports using commercially available silver and copper based alloys have not proved successful because cracks and laminations have been found to occur at the compact/alloy interface in use.

SUMMARY OF THE INVENTION

According to one aspect of the present invention, there is provided a method of bonding a cubic boron nitride compact to a cemented carbide support, the cubic boron nitride compact comprising a polycrystalline mass of cubic boron nitride particles, present in an amount of at least 70 percent by volume, bonded into a hard conglomerate, including the steps of metallising a surface of a cubic boron nitride compact by bonding a layer of gold, silver or a gold- or silver-based alloy to that surface and bonding the metallised surface to a surface of a cemented carbide support through a braze alloy having a liquidus temperature above 700° C.

According to another aspect of the invention, there is provided a tool component comprising a cubic boron nitride compact bonded to a cemented carbide support through an alloy bonding layer, the cubic boron nitride compact comprising a polycrystalline mass of cubic boron nitride particles, present in an amount of at least 70 percent by volume, bonded into a hard conglomerate, and the alloy bonding layer comprising 40 to 70 percent by weight silver or gold or a combination thereof and 1 to 10 percent by weight of an active metal selected from the group of titanium, zirconium, hafnium, vanadium, niobium, tantalum, chromium and molybdenum.

DESCRIPTION OF THE DRAWING

The drawing illustrates a perspective view of components which are used in an embodiment of the method of the invention.

DESCRIPTION OF PREFERRED EMBODIMENTS

In the method of the invention a cubic boron nitride compact is bonded to a cemented carbide support. The cubic boron nitride compact may be any known in the art and as described above.

Similarly, the cemented carbide may be any known in the art such as cemented tungsten carbide, cemented tantalum carbide or cemented titanium carbide. Cemented carbides are also known in the art as "hard metals" and "bonded carbides".

The metallised surface may be bonded to the surface of the support by placing the components for the braze alloy between the metallised surface and a surface of the support, applying a load thereto to urge the surfaces together and raising the temperature of the components in a non-oxidising atmosphere to the liquidus temperature of the braze alloy. The non-oxidising atmosphere is typically provided by a vacuum, e.g. a vacuum of $10^{-5}$ mbar or better.

The metallising layer of the compact will generally be a thin layer of the metal or alloy. Typically, the thickness of this layer will be less than 5 microns. This thin layer may be applied to the compact surface by methods known in the art such as vacuum deposition or vacuum sputtering.

The bonding alloy layer between the compact and support in the bonded product will generally, and preferably, contain an active metal selected from the group of titanium, zirconium, hafnium, vanadium, niobium, tantalum, chromium and molybdenum in addition to the silver or gold. This active metal will typically be provided in an amount of 1 to 10 percent by weight of the alloy. The silver and/or gold content of the alloy will preferably be 40 to 70 percent by weight. Such bonding alloys have been found to produce composite compacts in which the compact is firmly bonded to the cemented carbide support. Indeed, bond strengths of the order of 19 to 30 Kg/mm$^{-2}$ have been achieved. The degree of bond strength obtainable is believed to be due to the fact that the gold and/or silver provides a certain amount of ductility close to the compact surface while the active metal is the element in the bonding alloy which gives strength to the bond. It is important for achieving a good bond that the compact surface is first provided with a metallised surface containing gold or silver, as described above. The bonding alloy layer may also contain cobalt, iron, nickel, manganese and/or copper.

The gold and/or silver for the bonding layer is provided partly by the metallising layer and partly by the braze alloy or another alloy which is interposed between the metallising layer and the braze alloy. The active metal is provided in the braze alloy or in the alloy which is interposed between the metallising layer and the braze alloy or in both.

Thus, in one particular form of the invention, the metallising layer is gold or silver and there is bonded to this layer, a layer of a silver- or gold-based alloy prior to bonding the metallised surface to the support. The layer of silver- or gold-based alloy typically has a thickness of 150 microns. Examples of suitable gold or silver-based alloys are those which contain at least 90 percent by weight gold or silver and 1 to 10 percent by weight of the active metal described above. When such an intermediate layer is provided it has been found that particularly useful braze alloys are copper/manganese-based alloys.

In another form of the invention, the braze alloy contains gold and/or silver and the high melting metal. Typically the braze alloy will contain at least 40 percent by weight silver and/or gold and 1 to 10 percent by weight of a high melting metal as described above. An example of a particularly suitable alloy in this regard is a silver/copper/palladium/titanium alloy.

The layer of braze alloy typically has a thickness of less than 150 microns.

The alloy bonding layer in the final bonded composite compact is typically less than 200 microns in thickness.

The alloys for the various layers may be provided in the form of powders or foils.

The composite compact produced by following the teachings of the invention will generally be in the form of a disc as illustrated in the accompanying drawings. Referring to this drawing, there is shown a cemented carbide support 10, a braze layer in the form of a foil 12 and a cubic boron nitride compact 14. In carrying out the invention, the major surface 16 of the compact will first be metallised by providing it with a thin coating of silver or gold. Thereafter, the foil of braze alloy 12 will be placed on the metallised surface 16 and the support 10 placed on the foil 12 to form an unbonded stack. A load will be applied to the unbonded stack urging the various components together. The stack will be placed in a suitable vacuum furnace and heated to the appropriate temperature to cause bonding to occur between the metallised surface 16 and the support 10. The bonded composite compact so produced may be shaped or cut into various shapes using methods known in the art such as laser cutting. For example, the composite compact may be cut into rectangular, triangular, square or like shapes to produce components useful in turning or cutting tools.

The invention will be further illustrated by the following examples. In these examples, unless otherwise stated, percentages are percentages by weight.

EXAMPLE 1

A CBN compact in disc form was produced using methods known in the art. The compact consisted of a mass of intergrown CBN particles and a second phase consisting essentially of aluminium nitride and/or diboride.

A major flat surface of the CBN disc was degreased in alcohol and argon ion etched. The cleaned surface had applied to it a thin (approximately 0.1 microns) coating of gold using standard sputter coating techniques in an Edwards sputter coating unit. The gold layer was firmly bonded to the compact surface using this method.

A mixture of 95 percent by weight gold and 5 percent by weight tantalum powdered alloy was sieved on to the gold metallised surface through a 149 micron sieve. The amount of alloy applied was sufficient to cover the metallised surface evenly. The coating thickness was about 100 microns. The CBN compact so coated was heated to 1200° C. at a rate of 20° C./minute and held at this temperature for 20 minutes. Heating was carried out in a vacuum furnace at a pressure of better than $10^{-5}$ mbar. Thereafter, the CBN compact was cooled to ambient temperature. The metallised surface of the CBN compact contained gold and tantalum.

The metallised CBN compact was positioned on top of a 10 percent cobalt/tungsten carbide disc with the metallised face down. Between the metallised face and the cemented carbide disc was placed a 100 micron thick disc of Nicuman-36 alloy (56 Cu-36Mn-2Ni-3In-3Sn) having a melting range of 771° to 825° C. A load of about 50 to 100 grams was applied to the compact/carbide unbonded stack.

The stack was heated to 1000° C. at a rate of 20° C. per minute and held at this temperature for 10 minutes. Heating was carried out in a vacuum furnace at a pressure of better than $10^{-5}$ mbar. The stack was then allowed to cool to ambient temperature.

Recovered from the furnace was a CBN compact firmly bonded to a cemented tungsten carbide backing through a bonding layer having a thickness of about 150 microns. The bonding alloy layer contained gold, tantalum, the components of the Nicuman alloy and some cobalt from the carbide.

The mechanical strength of the bond was tested in a static shear test. The shear strength of the bond was found to be 30.25 kg mm$^{-2}$.

EXAMPLE 2

The method and materials of Example 1 were used save for the following:
1. The alloy bonded to the gold metallised CBN surface contained 93 percent gold, 5 percent tantalum and 2 percent aluminium.
2. The braze alloy was Degussa SCP3 containing 65 percent silver, 20 percent copper, and 15 percent palladium and had a melting range of 850° to 900° C.
3. The temperature used in bonding the bonded stack was 1100° C.

The shear strength of the bonding layer between the compact and carbide was found to be 26.47 kg mm$^{-2}$.

EXAMPLE 3

A surface of a CBN compact in disc form was metallised with a gold surface by following the method set out in Example 1.

The gold metallised surface was positioned on top of a 10 percent cobalt/tungsten carbide disc with the metallised surface down. Between the metallised surface and the cemented carbide disc was placed a 50 micron thick foil of an alloy having the following composition:

| Ingredient | Amount (% by weight) |
| --- | --- |
| Ag | 63 |

| Ingredient | Amount (% by weight) |
|---|---|
| Cu | 19 |
| Pd | 14 |
| Ti | 5 |

The unbonded stack was loaded with a 50 to 100 gm weight and then heated to 1100° C. at a rate of 20° C. per minute and held for 15 minutes. Heating was carried out in a vacuum furnace at a pressure of better than $10^{-5}$ mbar.

Thereafter, the bonded composite compact was allowed to cool naturally to ambient temperature.

The shear strength of the bonding layer between the compact and carbide was found to be 19.62 kg mm$^{-2}$.

The bonded composite compacts produced by each of the Examples above were cut into equilateral triangles thereby producing tool components. The triangular components were brazed to recessed tool shanks using commercially available low temperature brazes.

The tools were tested in a standard cutting test on 58 Rockwell hardness D2 steel. The steel workpiece was rotated at 325 rpm; a 0.5 mm depth of cut was used; and a feed rate of 0.15 mm rev$^{-1}$ was used. In all cases, the components performed very well with no evidence being observed of laminations occurring in the bonding layers between the compact and support.

We claim:

1. A method of bonding a cubic boron nitride compact to a cemented carbide support, the cubic boron nitride compact comprising a polycrystalline mass of cubic boron nitride particles, present in an amount of at least 70 percent by volume, bonded into a hard conglomerate, including the steps of metallising a surface of a cubic boron nitride compact by bonding a layer of gold, silver or a gold- or silver-based alloy to that surface and bonding the metallised surface to a surface of a cemented carbide support through a braze alloy having a liquidus temperature above 700° C., wherein said braze alloy contains at least 40% by weight silver, gold or a combination thereof and 1 to 10% by weight of an active metal selected from the group of titanium, zirconium, hafnium, vanadium, niobium, tantalum, chromium and molybdenum.

2. A method according to claim 1 wherein the metallised surface is bonded to the surface of the support by placing the components for the braze alloy between the metallised surface and a surface of the support, applying a load thereto to urge the surfaces together and raising the temperature of the components in a non-oxidising atmosphere to the liquidus temperature of the braze alloy.

3. A method according to claim 1 wherein the metallising layer has a thickness of less than 5 microns.

4. A method according to claim 1 wherein the cemented carbide is cemented tungsten carbide.

5. A method according to claim 1 wherein the braze alloy is a silver/copper/palladium/titanium alloy.

6. A method according to claim 1 wherein the thickness of the layer of braze alloy is less than 150 microns.

7. A method of bonding a cubic boron nitride compact to a cemented carbide support, the cubic boron nitride compact comprising a polycrystalline mass of cubic boron nitride particles, present in an amount of at least 70 percent by volume, bonded into a hard conglomerate, including the steps of metallising a surface of a cubic boron nitride compact by bonding a layer of gold, silver or a gold- or silver-based alloy to that surface and bonding the metallised surface to a surface of a cemented carbide support through a braze alloy having a liquidus temperature above 700° C., wherein the metallising layer is gold or silver and there is bonded to this layer, a layer of a silver- or gold-based alloy prior to bonding the metallised surface to the support.

8. A method according claim 7 wherein the layer of silver- or gold-based alloy has a thickness of less than 150 microns.

9. A method according to claim 7 wherein the gold or silver based alloy contains at least 90 percent by weight gold or silver and 1 to 10 percent by weight of an active metal selected from the group of titanium, zirconium, hafnium, vanadium, niobium, tantalum, chromium and molybdenum.

10. A method according to claim 9 wherein the active metal is tantalum.

11. A method according to claim 7 wherein the braze alloy is a copper/manganese based alloy.

* * * * *